(12) United States Patent
Tawri et al.

(10) Patent No.: US 8,699,322 B1
(45) Date of Patent: *Apr. 15, 2014

(54) PORT IDENTIFIER MANAGEMENT FOR PATH FAILOVER IN CLUSTER ENVIRONMENTS

(75) Inventors: Deepak K. Tawri, Mountain View, CA (US); Abhay K. Singh, Mountain View, CA (US); Raghu Krishnamurthy, Santa Clara, CA (US)

(73) Assignee: Symantec Operating Corporation, Mountain View, CA (US)

( * ) Notice: Subject to any disclaimer, the term of this patent is extended or adjusted under 35 U.S.C. 154(b) by 556 days.

This patent is subject to a terminal disclaimer.

(21) Appl. No.: 12/856,994

(22) Filed: Aug. 16, 2010

Related U.S. Application Data

(63) Continuation of application No. 11/731,854, filed on Mar. 30, 2007, now Pat. No. 7,778,157.

(51) Int. Cl.
*H04J 1/16* (2006.01)

(52) U.S. Cl.
USPC .......................................... 370/216; 370/314

(58) Field of Classification Search
USPC ......... 370/216, 217, 218, 219, 221, 225, 226, 370/227, 228, 315, 389, 419, 431, 458, 370/461; 709/213, 214, 216; 714/100, 1, 2, 714/3, 4.1, 6.1
See application file for complete search history.

(56) References Cited

U.S. PATENT DOCUMENTS

| | | | |
|---|---|---|---|
| 6,393,483 B1 | 5/2002 | Latif et al. | |
| 7,051,167 B2 | 5/2006 | Ito et al. | |
| 7,093,265 B1 | 8/2006 | Jantz et al. | |
| 7,260,737 B1 * | 8/2007 | Lent et al. | 714/5.11 |
| 7,293,152 B1 | 11/2007 | Srinivasan et al. | |
| 7,401,338 B1 | 7/2008 | Bowen et al. | |
| 2002/0194294 A1 | 12/2002 | Blumenau et al. | |
| 2003/0005350 A1 | 1/2003 | Koning et al. | |
| 2003/0188233 A1 | 10/2003 | Lubbers et al. | |
| 2003/0212785 A1 | 11/2003 | Jibbe | |
| 2004/0081087 A1 * | 4/2004 | Shea | 370/228 |
| 2004/0151188 A1 | 8/2004 | Maveli et al. | |
| 2005/0010688 A1 | 1/2005 | Murakami et al. | |

(Continued)

OTHER PUBLICATIONS

"dpANS SCSI Primary Commands—3 (SPC-3), Revision 23, Sec. 5.6—Reservations," Downloaded on Mar. 8, 2007 from: http://t10.org/ftp/t10/drafts/spc3/spc3r23.pdf, May 4, 2005, pp. 62-83.

"dpANS SCSI Architecture Model—3 (SAM-3), Revision 14," Downloaded on Mar. 17, 2007 from: http//t10.org/ftp/t10/drafts/sam3/sam3r14.pdf, Sep. 21, 2004, pp. i-xiii and 1-114.

(Continued)

*Primary Examiner* — Obaidul Huq
(74) *Attorney, Agent, or Firm* — Campbell Stephenson LLP

(57) ABSTRACT

A method includes assigning a port identifier to a first port on a node and communicating data on a first path between the first port and a logical unit on an active/passive storage array. The port identifier is registered in a persistent reservation scheme for the logical unit. The method also includes detecting a failure of the first path, de-assigning the port identifier from the first port, assigning the port identifier to a second port on the first node, and resuming communications between the node and the logical unit. One implementation of a system includes a first port configured to communicate with a storage device, a second port configured to communicate with the storage device, and an identifier management block. The identifier management block executes a failover with N_Port ID Virtualization commands that transfer a world wide port name from the first port to the second port.

23 Claims, 7 Drawing Sheets

(56) References Cited

U.S. PATENT DOCUMENTS

| | | | |
|---|---|---|---|
| 2005/0050392 A1 | 3/2005 | Baba et al. | |
| 2005/0080982 A1 | 4/2005 | Vasilevsky et al. | |
| 2005/0188161 A1* | 8/2005 | Taguchi | 711/152 |
| 2005/0281191 A1 | 12/2005 | McGee et al. | |
| 2006/0227702 A1 | 10/2006 | Ash et al. | |
| 2006/0253549 A1* | 11/2006 | Arakawa et al. | 709/217 |
| 2007/0073875 A1* | 3/2007 | Goto et al. | 709/224 |
| 2007/0094378 A1 | 4/2007 | Baldwin et al. | |
| 2007/0130295 A1 | 6/2007 | Rastogi et al. | |
| 2008/0028107 A1 | 1/2008 | Cherian et al. | |
| 2008/0104243 A1 | 5/2008 | Roscoe et al. | |

OTHER PUBLICATIONS

Frederick Wong, "Introducing N_Port Identifier Virtualization for IBM System z9," Downloaded on Mar. 8, 2007 from http://www.redbooks.ibm.com/redpapers/pdfs/redp4125.pdf, Apr. 6, 2006, pp. 1-26.

"Fibre Channel Framing and Signaling-2 (FC-FS-2), INCITS working draft proposed, Project T11/1619-D Rev 1.01, Chapter 4: Structure and Concepts," Downloaded on Mar. 8, 2007 from http://www.t11.org/ftp/t11/pub/fc/fs-2/06-085v3.pdf, Aug. 8, 2006, pp. 18-34.

Tommi T. Salli, "Flexibly Provisioning and Accessing Storage Resources Using Virtual Worldwide Names," U.S. Appl. No. 11/541,007, filed Sep. 29, 2006, pp. 1-22 and drawing sheets 1-6.

* cited by examiner

PORT IDENTIFIER MANAGEMENT FOR PATH FAILOVER IN CLUSTER ENVIRONMENTS

CROSS-REFERENCE TO RELATED APPLICATION

This application is a continuation of U.S. patent application Ser. No. 11/731,854 (which will issue as U.S. Pat. No. 7,778,157, on Aug. 17, 2010), entitled "Port Identifier Management for Path Failover in Cluster Environments," filed Mar. 30, 2007, naming Deepak K. Tawri, Abhay K. Singh, and Raghu Krishnamurthy as the inventors, and assigned to Symantec Operating Corporation, the assignee of the present invention. This application is hereby incorporated by reference in its entirety and for all purposes as if completely and fully set forth herein.

FIELD OF THE INVENTION

The present invention relates to storage devices in distributed computer systems and, more particularly, to coordinating storage path failover in a clustered environment.

DESCRIPTION OF THE RELATED ART

A clustered computing system can include several host computers that process data and/or respond to requests for data. The host computers may typically be computer systems that include various software and hardware components. In various settings, the hosts may also be referred to as nodes, reflecting their participation in a networked system. The nodes may operate as a cluster in which the nodes are interconnected to share resources. The clustered nodes may be configured to share the computing load involved in various computing tasks. In support of various applications and operations, the nodes may exchange data over, for example, a network such as an enterprise-wide intranet or other local area network (LAN), or over a wide area network (WAN) such as the Internet. Additionally, the network may allow various client computer systems to communicate with the nodes. The clustered nodes may also communicate with each other and with other computing nodes over a private network that more directly links the nodes.

Distributed computing systems such as node clusters are an increasingly important part of research, governmental, and enterprise computing systems. Among the advantages of such computing systems are their ability to handle a variety of different computing scenarios including large computational problems, high volume data processing situations, and high availability (HA) situations. Such distributed computing systems typically utilize one or more storage devices in support of the computing operations performed by one or more of the nodes.

These storage devices may be quite numerous and/or heterogeneous. In an effort to aggregate such storage devices and to make such storage devices more manageable and flexible, storage virtualization techniques are often used. Storage virtualization techniques establish relationships between physical storage devices, e.g. disk drives, tape drives, optical drives, etc., and virtual or logical storage devices such as volumes, virtual disks, and logical units. A logical unit may be a disk or other storage device. (A logical unit may be referred to as a LUN. The term "LUN" is also used in various contexts to mean the logical unit number of a logical unit.) Alternatively, virtualization may be used to designate a portion of a disk or other storage device as a logical unit. Thus, in various implementations a logical unit may consist of only a portion of a physical device, such as a logical section of a single disk drive. Similarly, virtualization generally allows that multiple disks or other storage devices, or portions thereof, may be combined to form a single logical unit. In some implementations, a logical unit may therefore include multiple physical devices, e.g., several disk drives, that are logically presented as a single device. The virtualization techniques typically provide system-wide features, e.g., naming, sizing, and management, better suited to the entire computing system than those features dictated by the physical characteristics of storage devices. Additionally, virtualization techniques enable and/or enhance certain computing system operations such as clustering and data backup and restoration.

The storage devices may be linked together and accessed through a storage area network (SAN). The storage devices may include components such as tape libraries, groups of disk drives (i.e., "just a bunch of disks" or "JBOD"), and storage arrays such as intelligent disk arrays. The SAN can be implemented, for example, as a high-speed network that allows the connections between the storage devices and the nodes in a cluster. The SAN may thus be shared among the nodes, and may allow for the sharing of storage devices among the nodes to provide greater availability and reliability of storage. Other geometries are also possible: shared resources may be directly connected to some or all of the nodes in the computing system, and the computing system need not include a SAN. Alternatively, the nodes may be connected to multiple SANs.

One type of storage array used in such environments is an active/passive (A/P) storage array, which generally includes at least two input/output (I/O) ports. Such a device allows for redundant connections to the various computing nodes through the multiple I/O ports. A node can be connected to an A/P storage array through two (or more) network paths. One path can be used to connect the node to one of the ports on the storage array. A second path can be used to connect the node to another one of the ports on the storage array. In various implementations, these alternate paths may be fully disjoint. In other implementations, these paths may share one or more intermediate links, intermediate resources, or terminating ports. For each logical unit on the storage array, one of the paths is designated as an active path, and is used for reading and writing data on the logical unit. The other path (or paths) is designated as a passive path, and is used as a backup path. In the event that some aspect of the active path fails, the passive path is designated as the new active path, and communication continues through this new active path until conditions allow the original active path to resume service. The process of switching among the redundant paths to a storage array in response to a failure is known as failover.

An A/P storage array may suffer significant degradation in performance if a logical unit within the storage array is accessed through both the active path and the passive path. This situation may be described as a "trespass" onto the passive path. Thus, measures need to be taken to ensure that only one of the paths—the designated active path for a logical unit—is used for communicating with that logical unit. These measures require that failovers be performed with care to avoid a situation in which a logical unit is accessed through a passive path during the failover process.

These measures generally become more involved in the cluster environment. The cluster environment imposes additional challenges to coordinating a failover, since multiple nodes may seek access to a single logical unit during the failover process. Still further, fai lovers in a cluster environment can be substantially complicated by the use of fencing techniques, in which the nodes are policed to prevent the separate nodes from writing to the storage array in an uncoordinated manner. During a failover, the fencing measures may generally need to be revised throughout a distributed system to assure a correct coordinated failover. This revising is generally slow and cumbersome. Thus, it would be helpful to obtain tools that allow a quicker or more streamlined failover process in a clustered environment.

SUMMARY

Described herein are systems and methods for switching communications paths in a network. One implementation of a method includes assigning a port identifier to a first port on a node in a cluster. The port identifier is registered as a permitted port identifier for communicating with a storage unit coupled to the cluster. The registering includes recording a registration key as a permitted registration key for the storage unit, with the registration key corresponding to the port identifier. Data is communicated between the first port and the storage unit through a first path that couples the first port to the storage unit. The method also includes detecting a failure of the first path, de-assigning the port identifier from the first port, assigning the port identifier to a second port on the first node, and resuming communications between the node and the storage unit. The resumed communications are carried on a second path between the second port and the storage unit. The method may also include features of coordinating the switching for several nodes in the cluster. In situations where the storage unit includes a logical unit in an active/passive (A/P) storage array, the switching may be performed in a coordinated manner to prevent communications that trespass onto passive storage controllers.

One implementation of a system includes a first port configured to communicate with a storage unit, a second port configured to communicate with the storage unit, a first memory that holds a first port identifier for the first port, a second memory that holds a second port identifier for the second port, and an identifier management block. The identifier management block is configured to respond to a failover instruction by revising the contents of the first and second memories. In one implementation, the identifier management block is configured to use N_Port ID Virtualization (NPIV) commands to include the first port identifier in the second memory.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION OF THE EMBODIMENTS

Figure 1:
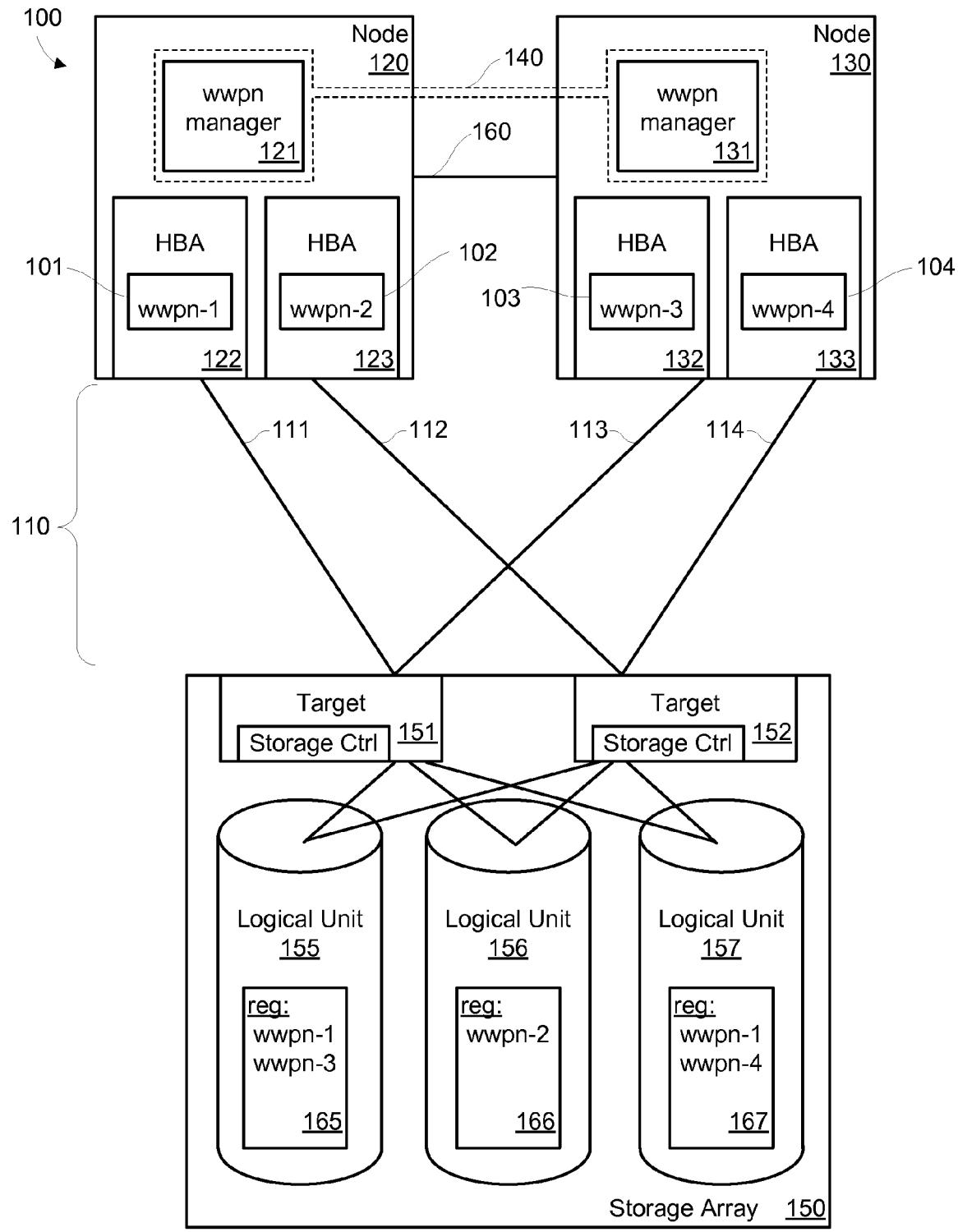
FIG. 1 shows an example of a computing cluster.

FIG. 1 shows an example of a computing cluster 100. Cluster 100 includes two nodes 120 and 130 that process and serve data to client systems (not shown). Each of the nodes 120 and 130 is coupled to an A/P storage array 150, which holds data used by the nodes 120 and 130. Other implementations of a computing cluster may include more than two nodes, and may include more than one storage system. The connections between storage array 150 and the nodes include two paths 111 and 112 that couple node 120 to storage array 150. The connections also include two paths 113 and 114 that couple node 130 to storage array 150. Paths 111, 112, 113, and 114 are implemented in a Fibre Channel SAN 110. It is contemplated that in other implementations, other communications media may be used, such as other optical media; or coaxial, twisted pair or other transmission line media; or wireless links such as infrared or radio links.

Each of the two nodes 120 and 130 includes two host bus adapters (HBAs). In this example, each of the four HBAs is used to enable communication on one of the four paths between the nodes and the storage array. An HBA 122 provides a communications port on node 120 that connects with path 111. An HBA 123 provides a communications port on node 120 that connects with path 112. An HBA 132 provides a communications port on node 130 that connects with path 113. An HBA 133 provides a communications port on node 130 that connects with path 114.

Each of the HBAs 122, 123, 132, and 133 includes a port identifier module 101, 102, 103, and 104, respectively. The port identifier modules hold identifiers that identify the HBAs on SAN 110. For example, the port identifiers in cluster 100 are 64-bit world wide port names (WWPNs). In other implementations, a cluster may use 48-bit media access control (MAC) addresses or other indicators as port identifiers. The port identifiers are generally manufacturer-assigned numbers that serve to uniquely identify the port hardware. However, it is possible in some cases to modify the port identifier for an HBA. For example, N-Port ID Virtualization (NPIV) tools enable the modification of the WWPN employed by an HBA, and also enables multiple WWPNs to be assigned to an HBA.

In various situations, NPIV provides a Fibre Channel facility for sharing a single physical N_Port among multiple N_Port identifiers, thereby allowing multiple initiators, each with its own N_Port identifier, to share the same physical N_Port. NPIV is supported by major HBA vendors (e.g. QLogic Corp. and Emulex Corporation). NPIV may be used to provide multiple virtual HBAs through a single physical HBA on virtualization servers.

The cluster 100 also includes a port identifier management tool 140. In the illustrated example, the port identifier management tool is implemented on each of the separate nodes as a wwpn manager 121 and a wwpn manager 131. Wwpn manager 121 runs on node 120 and wwpn manager 131 runs on node 130 to execute the operations of port identifier management tool 140. (In other embodiments, the port identifier management tool is implemented on a single node, such as a master node for the cluster, or on a device separate from the cluster nodes.)

In one implementation, port identifier management tool 140 uses NPIV operations to handle the assignment and reassignment of wwpn identifiers on the various HBAs in a cluster. Port identifier management tool 140 provides capabilities of re-assigning port identifiers to the communications ports on the nodes in the cluster. The port identifier management tool can, in various implementations, assign multiple wwpn identifiers to a single HBA. These capabilities may be used to streamline failover operations, as described below.

The storage array includes two target ports 151 and 152. Target port 151 provides a communications port and a storage controller on storage array 150, and connects with paths 111 and 113. Target port 152 provides a communications port and a storage controller on storage array 150, and connects with paths 112 and 114. In this example, storage array 150 includes three logical units: a logical unit 155, a logical unit 156, and a logical unit 157. In this example, each of the target ports 151 and 152 can access each of the three logical units 155, 156, and 157.

In the example described above, each node has two HBAs, and the storage array has two target ports. In other implementations, different numbers of ports may be used on the nodes and storage arrays.

The multiple paths 111, 112, 113, and 114 provide flexibility in the communications between the nodes and the storage array. This flexibility may be used, for example, to provide load balancing. Thus, node 120 may assign some data streams to HBA 122 and other data streams to HBA 123. These assignments may be made in an effort to balance or best utilize the available capacity of the corresponding paths 111 and 112. The flexibility afforded by the multiple paths may also be used to provide some fail-safe redundancy. In the event of a failure of path 111, node 120 may switch the data streams that were carried on that path so that they are carried instead on path 112. Similar load balancing and fail-safe considerations may also be handled by node 130. The management and coordination of such multiple path communications may be managed by system software running on node 120. For example, Veritas Volume Manager™ with Dynamic Multipathing (DMP) provides tools for coordinating multi-path communications.

In a clustered computing environment, the operations of the clustered nodes are preferably coordinated so that the nodes work together to execute the desired operations. Cluster 100 includes a cluster LAN 160 to facilitate communication among the nodes in the cluster. Nodes 120 and 130 may communicate with each other over LAN 160 to manage computational tasks. For example, nodes 120 and 130 may cooperate to process data stored on logical unit 155 that is related to a protein-folding problem. The nodes may similarly cooperate to process data stored on logical unit 157 for billing statements. The communications between the nodes on LAN 160 can be used to divide the tasks so that each node works on separate portions of the protein-folding data on logical unit 155, and so that each node works on separate portions of the billing data on logical unit 157. The nodes may also coordinate efforts so that several nodes work together on the same portions, or overlapping portions, of data in a productive manner. This cluster-wide coordination can be used to enhance the efficiency of the cluster's operation. The coordination can also prevent corruption of the data, which may occur if each of the nodes were to modify data in the logical units independently, without heeding the modifications that being performed by their companion nodes.

Fencing is a procedure to avoid undesirable access to data by nodes that are not participating in a coordinated operation on the data. Fencing can be used to protect stored data from the inadvertent corruption that can occur when multiple nodes attempt to simultaneously modify the data in an uncoordinated manner. Cluster 100 implements fencing by storing a list of registered keys for each of the logical units. The keys are stored in storage array 150. Each registered key indicates a port identifier such as a WWPN for an approved HBA in the nodes. To enforce the fencing procedure, the storage array allows access to a given logical unit only from HBAs that bear the identifiers associated with the registered keys for that logical unit. Schemes such as this may be called persistent registration schemes. The registered keys persist as indicators of the allowed HBAs until they are deliberately modified by appropriate commands when needed.

As an example, FIG. 1 shows that logical unit 155 has a key registry 165 in which two keys are registered. These keys, which may be tokens or data records or other indicators stored in the storage array, indicate that logical unit 155 will accept communications from an HBA only if the HBA has a port identifier of "wwpn-1" or "wwpn-3." In the illustrated example, "wwpn-1" is the port identifier assigned to HBA 122, and "wwpn-3" is the port identifier assigned to HBA 132. Thus, the fencing operations of storage array 150 will permit access to logical unit 155 by node 120 through HBA 122, and by node 130 through HBA 132. Other HBAs (e.g. 123 and 133) would be "fenced off" from accessing logical unit 155.

Similarly, logical unit 156 has a key registry 166 in which one key—corresponding to "wwpn-2"—is registered, and logical unit 157 has a key registry 167 in which two keys—corresponding to "wwpn-1" and "wwpn-4"—are registered. The "wwpn-2" and "wwpn-4" identifiers are assigned to HBAs 123 and 133, respectively. Thus, it can be seen from the figure that the fencing operations of storage array 150 will permit access to logical unit 156 by node 120 through HBA 123. Similarly, the fencing operations will permit access to logical unit 157 by node 120 through HBA 122, and by node 130 through HBA 133.

In this description, labels such as "wwpn-2" have been used to simplify the discussion. In this implementation, a port identifier such as "wwpn-1" represents an identifier, such as a 64-bit WWPN address, that is stored in or otherwise bound to an HBA on a node. Where a label such as "wwpn-1" appears in a key registry (e.g., 165), it indicates a digital key that has been directly or indirectly associated with the 64-bit WWPN address. The presence of a digital key in a key registry means that an HBA (or other port) with the associated port address is permitted to access the logical unit (e.g., 155) supported by that key registry.

It is contemplated that various types of access can be managed by the key registries. In a simple example, only the registered HBAs for a logical unit can read, write, or otherwise access that logical unit. All other logical units are completely denied access to that HBA. In this configuration, the situation shown in FIG. 1 would allow read and write access to logical unit 155 only through HBAs 122 and 132; HBAs 123 and 133 would be denied any access to logical unit 155. In another configuration, the "access" managed by the fencing operations may be only write access. In such a configuration, all the HBAs would be allowed read access to all of the logical units, but only the registered HBAs would be able to write to the various logical units. In yet other configurations, the fencing operations may provide various combinations of access to each of the HBAs.

In the event that one of the paths fails, a node may switch communications to use an alternate path instead of the failed path. The failover operations involved in such a recovery generally need to be done in a way that does not clash with any fencing measures that are in effect. For example, consider a situation in which a hardware failure disables path 111. In response to the failure, node 120 may redirect its communications with the storage array so that all communications are carried by the remaining path 112. Any data streams that were being sent over path 111 will then be sent instead over path 112. However, path 112 is connected to node 120 through HBA 123, which is not registered on logical unit 155. The fencing operations would therefore prevent HBA 123 from accessing logical unit 155.

One approach to overcoming this fencing issue is to update the registry 165 for logical unit 155 to include a registration key for "wwpn-2"—the port identifier of HBA 123. Depending on the implementation, the updating may also require that the registration key for "wwpn-1" be deleted from registry 165, since the corresponding HBA 122 is no longer in use. Similar updates will also be required for registry 167, which would also need a registration key for "wwpn-2." This approach to performing failovers in a cluster environment with persistent registration thus involves updating the registered keys as part of the failover process. This updating can be time consuming, especially in clusters with larger numbers of components than the simple situation shown in FIG. 1. Depending on the location of the failure in a network topology, many nodes and many storage arrays may be affected, and each storage array may have a large number of affected logical units. Updates will be needed for each of the affected logical units, and each of the affected logical units will need to be updated with registration keys for each of the affected nodes. This updating can be cumbersome and time consuming, and may substantially hinder a quick recovery from a path failure.

An alternate approach to coordinating a failover with a persistent registration scheme involves leaving the registration keys unchanged in response to a path failure. Instead of updating the registration keys on the storage arrays, this alternate approach updates the port identifiers on the nodes in the cluster. An example of this approach is illustrated in FIG. 2.

Figure 2:
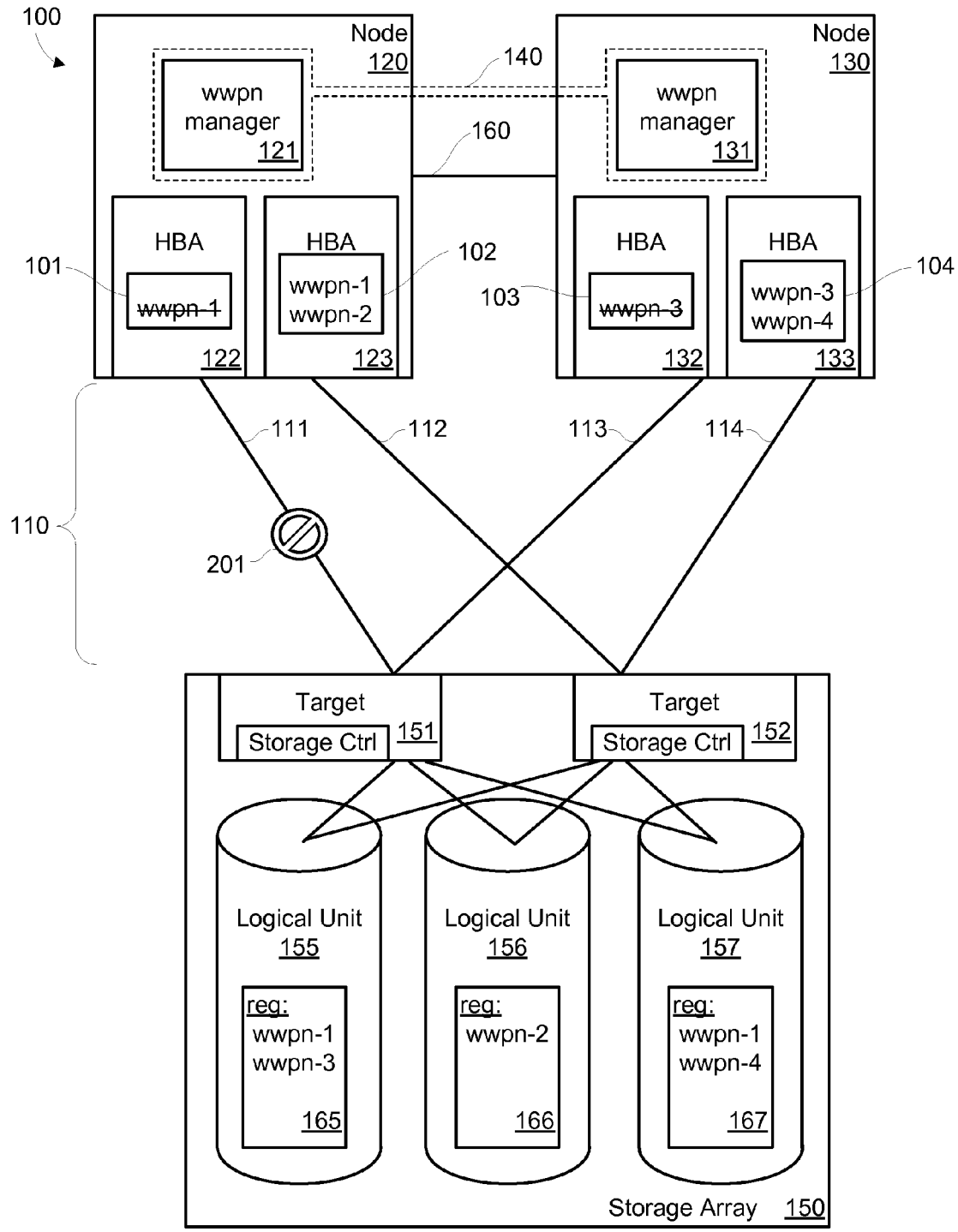
FIG. 2 shows an example of a response by a cluster to a path failure.

FIG. 2 shows an example of a response by cluster 100 to a path failure. In this example, path 111 has failed, as indicated by an outage 201. As a result of the path failure, node 120 is unable to reach the storage array through HBA 122, which was connected to path 111. In response, node 120 initiates a failover procedure. As discussed below, the failover procedure will be a coordinated cluster-wide failover. The goal of this failover is to restore communications by redirecting the communications streams previously handled by path 111 so that they are handled instead by path 112.

To prevent the redirected communications streams from being rejected by the storage array, it is necessary to ensure that HBA 123 (connected to path 112) is allowed to communicate with the appropriate logical units. HBA 123 originally had a port identifier of "wwpn-2," which was not registered with either logical unit 155 or with logical unit 157. Instead of updating the registries on these logical units, the approach depicted in FIG. 2 revises the information in the port identifier modules on the nodes. Thus, the port identifier module 102 for HBA 123 is updated to include "wwpn-1" as well as the original "wwpn-2." By including "wwpn-1" among the identifiers for HBA 123, the failover process makes HBA 123 an allowed HBA for accessing logical units 155 and 157, which were previously accessed by HBA 122.

The revisions to the port identifier modules are made by port identifier management tool 140. More specifically, in the illustrated example, the contents of port identifier module 102 are modified by wwpn manager 121 to include the identifier "wwpn-1." Wwpn manager 121 may also be used to remove the port identifier "wwpn-1" from port identifier module 101, as illustrated, to preserve the uniqueness of the port identifiers.

Additional measures may be taken when a failure affects paths to an A/P storage array. As illustrated in FIG. 2, the wwpn manager 131 on node 130 modifies the contents of the port identifier modules 103 and 104. This additional modification deletes the port identifier "wwpn-3" from port identifier module 103 and adds this port identifier to port identifier module 104. This additional measure may be necessary despite the fact that none of the paths that serve node 130 (paths 113 and 114) are directly affected by the outage 201. The reason can be seen from the geometry of the connections between the nodes and the storage array. Node 130 could, in principle, continue to access logical unit 155 through path 113, which has not been affected by outage 201. However, if path 113 were to be used for access to logical unit 155, the result would be that logical unit 155 would be actively accessed through two different target ports: node 120 would start to use target port 152 (connected to HBA 123 via path 112) to access to logical unit 155, while node 130 would continue to use target port 151 (connected to HBA 132 via path 113). As a result, logical unit 155 would be actively accessed by the two different storage controllers in the two different target ports 151 and 152. This situation involves a trespass usage of a passive storage controller on the A/P storage array, which can substantially degrade the performance of storage array 150. Various cache-management and communication overhead issues arise when an A/P storage array accesses a logical unit contemporaneously through two different storage controllers.

To ensure that logical unit 155 is accessed only through a single storage controller, wwpn manager 131 carries out an additional measure of moving the port identifier "wwpn 3" from port identifier module 103 to port identifier module 104. Node 130 also redirects its communications with the storage array so that all communications to logical unit 155 are carried by path 114, which connects HBA 133 (now labeled with "wwpn-3" and with "wwpn-4") to target port 152.

In the resulting situation, communication proceeds between node 120 and logical unit 155 via path 112. Communication also proceeds between node 130 and logical unit 155 via path 114. In both cases, logical unit 155 is accessed through paths that use only target port 152, and do not use target port 151. This situation thus avoids the cache-management and communication overhead issues that can degrade the performance of an A/P storage array.

The failover operation in the example of FIG. 2 does not require any modification of the registries 165, 166, and 167. This aspect of the operation may provide a benefit of a simplified or accelerated failover, since it reduces or eliminates the need for updating the registries in a persistent registration scheme.

In addition, the operation in FIG. 2 may be carried out without requiring more than one registration per node at any time for each logical unit. This feature differs from the situation in other approaches, where make-before-break registrations are made in registries to perform a failover. In such failovers, a node registers a new HBA in a logical unit's registry before deleting an old HBA from the registry. This scenario incurs some risk of a trespass during the brief time in which both HBAs are simultaneously registered for the logical unit. The operations discussed with respect to FIG. 2 may avoid such issues, since only one HBA is registered per node at any time for each logical unit.

Still further, the operations from FIG. 2 may reduce a risk of a failover operation clashing with a fencing operation. An alternate approach to failover involves a node detecting a failure, establishing a new path to a logical unit, and updating the registry of the logical unit through the new path. If by chance this node is being fenced out at the same time, then there is a risk that the node may inadvertently defeat the fencing by establishing a new registration key through the new path. The failover operations in FIG. 2 can mitigate this risk by limiting a node to use only one registration key for each logical unit. In some implementations, this aspect of the operations in FIG. 2 can reduce or eliminate the need to check for defeated fencing. Such checks typically involve additional checks of registered keys and additional key removal operations; avoiding these checks and removals may additionally streamline the failover process.

Still further, the failover operation in FIG. 2 may allow for more efficient use of registration keys. In some implementations, logical units allow only a limited number of keys to be registered. For example, consider a situation where a storage array allows only 32 registration keys per logical unit. One approach to enabling all the HBAs on all the nodes to access a particular logical unit would be to register each of the HBAs be on the logical unit, with those registrations standing ready for use in case a failover is needed. However, this approach is an expensive use of registration keys. For example, if the nodes in a cluster each have four HBAs, then the maximum number of nodes that could access the logical device is 32/4=8 nodes. In contrast, the approach outlined in the discussion of FIG. 2 would allow 32 nodes to register; each node would need only one registration key that would be shared, as needed, among all the HBAs on the node.

The failover operation presented in FIG. 2 involves responses both by node 120 and by node 130. To maintain a single active port on A/P storage array 150, both nodes need to redirect all or some of their data traffic through a different HBA. Both nodes thus need to modify contents of port identifier modules on their HBAs. As a result, this failover is a cluster-wide coordinated operation. The failover is coordinated among the nodes of the cluster through control messages transmitted over LAN 160.

In some situations, it is possible that a failover need not be performed on a cluster wide basis. Instead, some path failures may be addressed by a local single-node response. Some examples include situations where a path failure only affects a logical unit that is accessed by only a single node, or where a path failure only impacts logical units on active-active storage arrays (varieties of which are not affected by trespass issues) coupled to a single node. Another example of such a situation is presented in FIG. 3.

Figure 3:
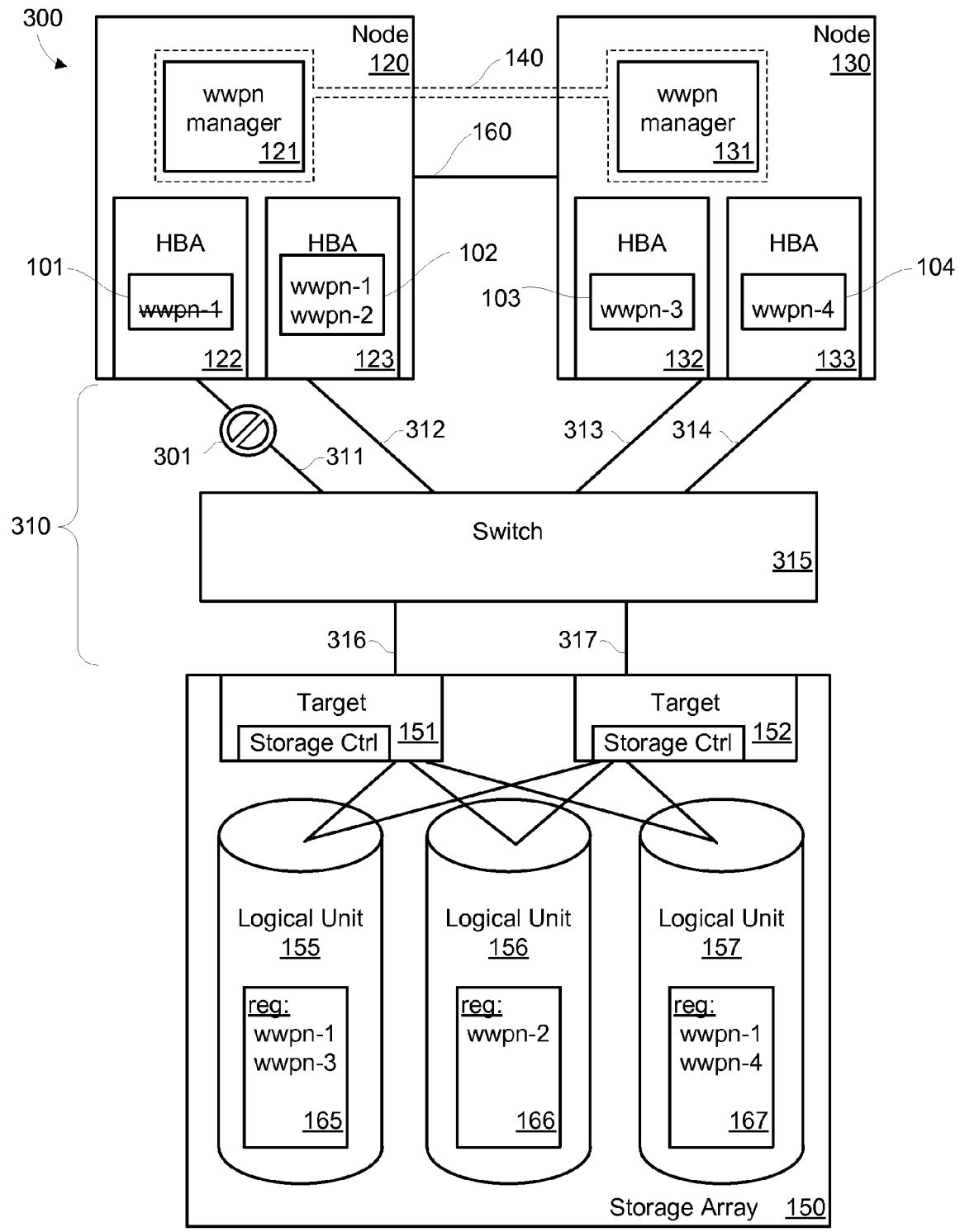
FIG. 3 shows another example of a computing cluster.

FIG. 3 shows another example of a computing cluster 300. In this implementation, a SAN 310 with a central switch 315 is used in place of the SAN 110 from FIGS. 1 and 2. In this implementation, the target ports 151 and 152 are not connected directly to the nodes 120 and 130. Instead, target port 151 is connected to switch 315 through a link 316 and target port 152 is connected to switch 315 through a link 317. Switch 315 is connected to HBAs 122, 123, 132, and 133 through links 311, 312, 313, and 314, respectively.

This figure shows a response to a failure of link 311. The failure is indicated by an outage 301. In response, node 120 moves the port identifier "wwpn 1" from port identifier module 101 to port identifier module 102. Node 120 also redirects its communications with the storage array so that all communications to storage array 150 are carried by a path from HBA 123 that includes link 312, switch 315, and link 316. Note that this pathway terminates at target port 151. Thus, the failover in response to outage 301 does not involve a change in the target port. As a result, there is no need to follow up with a corresponding adjustment to target ports used by any other nodes in cluster 300. In this example, the port identifiers "wwpn-3" and "wwpn-4" on node 130 remain assigned to HBAs 132 and 133, respectively. (It will be appreciated by a skilled artisan that adjustments on node 130 could indeed be necessary in cluster 300 if the outage had affected some other links, such as link 316, instead of link 311.)

Figure 4:
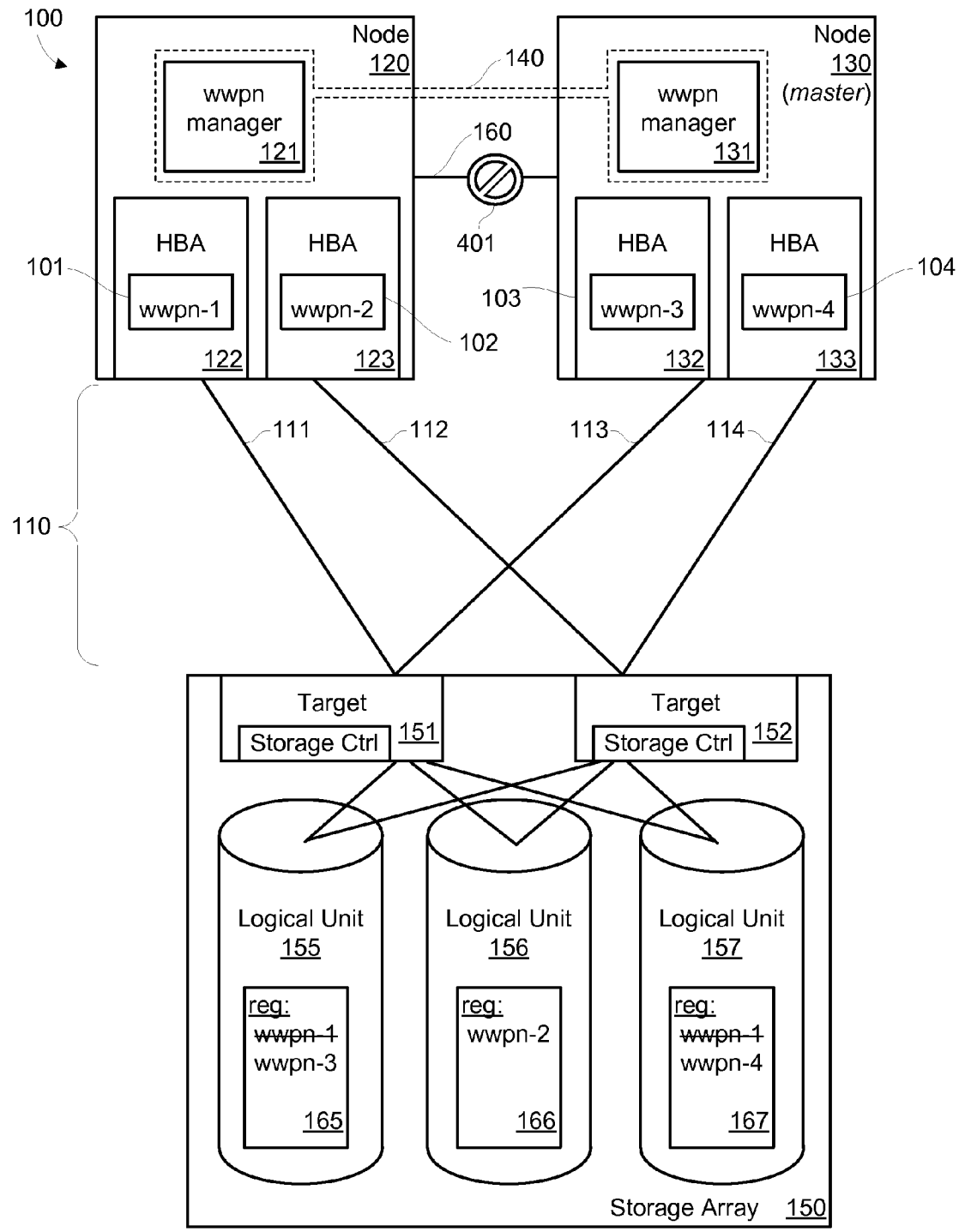
FIG. 4 illustrates a situation of a "split-brain" problem.

FIG. 4 illustrates a situation of a "split-brain" problem. In this situation, coordination among the nodes in a cluster has been lost. In the illustrated example, this loss arises from a failure of LAN 160, as indicated by an outage 401. As a result, the nodes in this situation are unable to coordinate processing operations and access to the various logical units. To protect the integrity of the operations and the integrity of the data on the storage array, the fencing mechanisms are invoked by a master node in the cluster. The master node is generally a designated node that is assigned to oversee the coordination of the cluster and to isolate nodes from the cluster if they are for some reason unable to participate in coordinated activities. For example, in the example of FIG. 4, node 130 is the designated master node. Because of outage 401, node 120 is no longer able to coordinate operations with master node 130. Upon detecting the loss of communication with node 120, the master node 130 uses the fencing operations of the storage array to revise the key registries 165, 166, 167 to prevent uncoordinated access to the corresponding logical units. In particular, the master node fences off node 120 by revoking the keys for "wwpn-1" (HBA 122) from registries 165 and 167. These revocations prevent uncoordinated duplicative access to logical units 155 and 157, which are being accessed by node 130. After the revocation, only node 130 has access to these logical units; the uncoordinated node 120 has been fenced off from these logical units. (Node 120 may additionally be fenced off from logical unit 156. Alternatively, node 120 may continue to be allowed access to logical unit 156, as shown in FIG. 4, if node 120 is the only node operating on data in logical unit 156.)

The operations for responding to the split-brain situation in FIG. 4 involve updating the persistent registration information for storage array 150. Cluster 100 responds to outage 401 in a manner different than was used for outage 201 in the discussion of FIG. 2. In response to the outage 201 from FIG. 2, cluster 100 modified the contents of the port identifier modules 101, 102, 103, and/or 104 in the nodes. In contrast, the response to outage 401 involves updates made to the registries 165, 166, and/or 167 in the storage array. In this example, cluster 100 thus includes the ability to respond with either a node-side or storage array-side update of information in response to a path failure.

Figure 5:
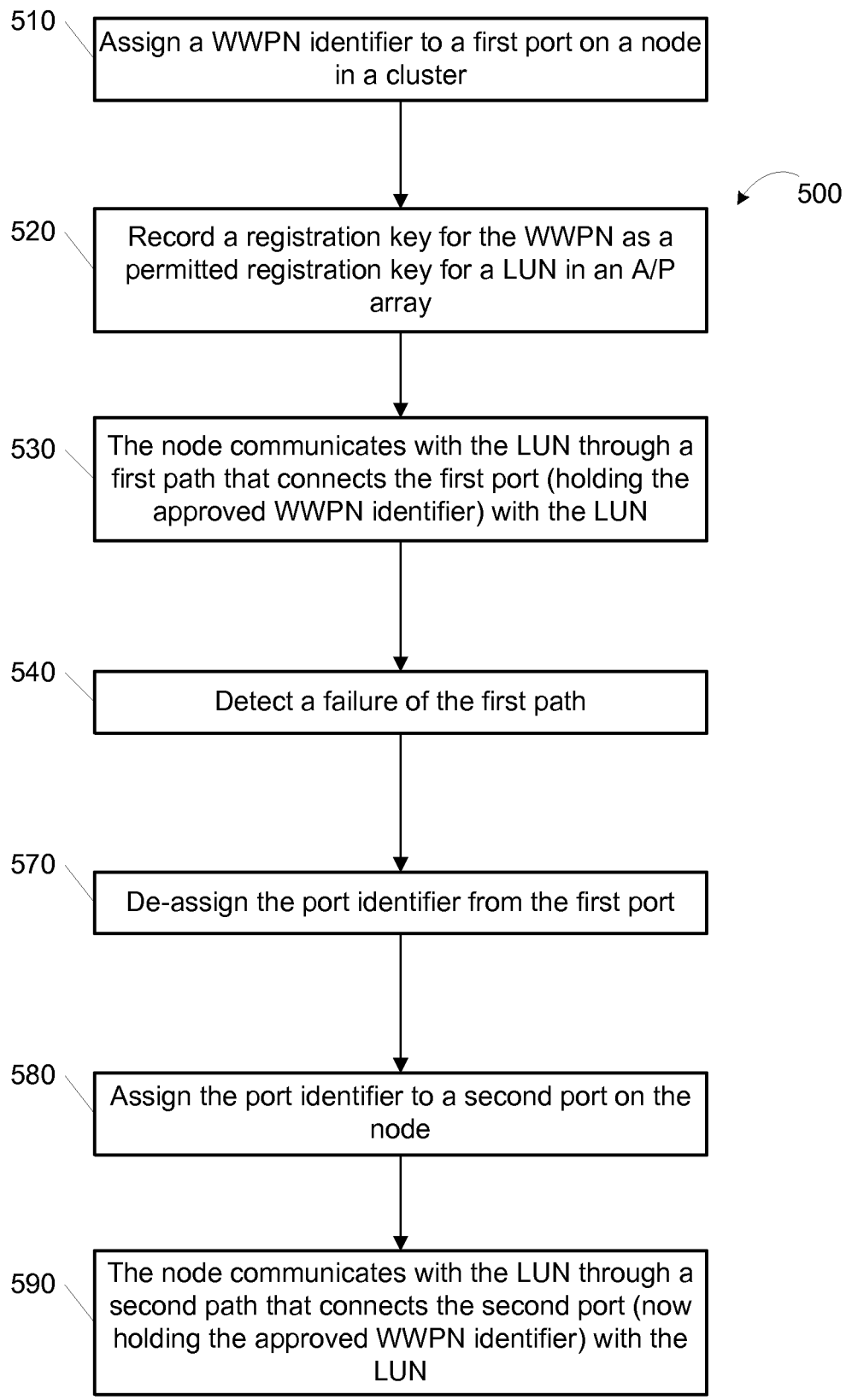
FIG. 5 illustrates a method for performing a single-node failover using tools to reassign port identifiers.

FIG. 5 shows an example of a method 500 for performing a single-node failover using tools to reassign port identifiers. The method commences in act 510, where a node in a cluster assigns a WWPN identifier (or other port identifier, such as a MAC address) to one of the communications ports (such as an HBA unit) on the node. In this example, the node needs to communicate with a logical unit (LUN) on an A/P storage array that is protected by a persistent registration fencing scheme. In order to allow this communication with the LUN, in act 520 the cluster registers the WWPN identifier from act 510 in a registry for the LUN. In act 530, the node then communicates with the LUN. The communication is carried through a path that includes the communications port on the node with the WWPN identifier, a target communications port on the A/P storage array, and at least one intermediate link between these end-point communication ports. The path may additionally include intermediate devices and additional links, and may be implemented in a Fibre Channel SAN.

In act 540, a failure is detected in the path that was used for communication in act 530. In response to the failure, the cluster de-assigns the WWPN identifier from the communications port on the node (act 570), and re-assigns the WWPN identifier to a second communications port on the node (act 580). The second communications port is selected as a port that is not impacted by the failure. In act 590, the node then communicates with the LUN through a second path that includes the second communications port on the node, the target communications port on the A/P storage array, and at least one intermediate link that provides routing around the failure.

Figure 6:
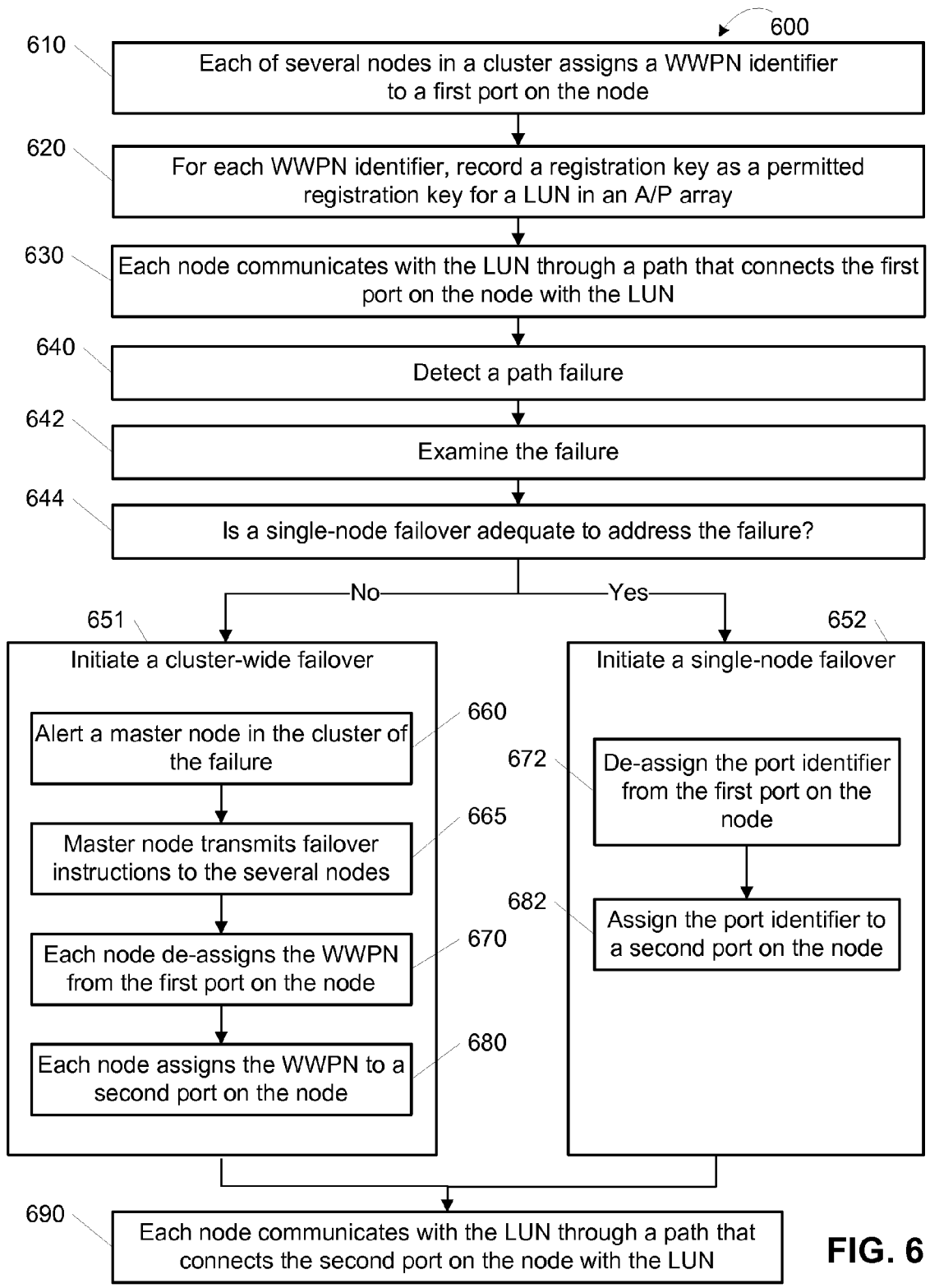
FIG. 6 illustrates a method for performing a cluster-wide failover using tools to reassign port identifiers.

FIG. 6 shows an example of a method 600 for performing a cluster-wide failover using tools to reassign port identifiers. In this example, several nodes in the cluster need to communicate with a particular LUN on an A/P storage array. The method commences in act 610, where each of the several nodes assigns a WWPN identifier (or other port identifier, such as a MAC address) to a first one of the communications ports (such as an HBA unit) on that node. The WWPN identifiers are unique; that is, they serve as non-ambiguous or distinct identifiers for the first ports on the several nodes. In act 620 the cluster registers the appropriate WWPN identifiers from act 610 in the registry for the LUN. In act 630, the several nodes then communicate in a coordinated manner with the LUN. The communication is carried through several paths, each of which includes a corresponding first communications port on one of the several nodes, a target communications port on the A/P storage array, and at least one intermediate link between these end-point communication ports. The various paths may additionally include intermediate devices and additional links, and may be implemented in a Fibre Channel SAN.

In act 640, a failure is detected in at least one of the paths from act 630. In response, the cluster examines the failure in act 642. The examination may consider features such as the topology of a communications network that carries the paths from act 630, and such as the location of the failure within that topology. Based on the examination, a decision is made in act 644 whether a single-node failover is adequate to address the failure, or whether a coordinated cluster-wide failover is needed to address the failure.

If a single-node failure is deemed adequate in act 644, then control proceeds to act 652, in which a failover is performed on only one of the nodes among the several nodes that communicate with the LUN. This failover commences in act 672, which de-assigns the WWPN identifier from the first communications port on the node. In act 682, the WWPN identifier is re-assigned to a second port on that node.

If a cluster-wide failure is deemed necessary in act 644, then control proceeds to act 651, in which a coordinated failover is performed on the several nodes that communicate with the LUN. This coordinated failover commences in act 660, in which a master node is alerted to the failure. The master node sends failover instructions in act 665 to the several nodes that communicate with the LUN. In act 670, in response to the failover instructions, each of the several nodes de-assigns the corresponding WWPN identifier from the first communications port on the node. In act 680, in response to the failover instructions, each of the several nodes assigns the corresponding WWPN identifier to a second communications port on the node.

In act 690, each of the updated nodes resumes communication with the LUN through a second path that include the second communications port, the target communications port on the A/P storage array, and at least one intermediate links that provides routing around the failure.

A variety of alternative implementations are contemplated for the foregoing systems and methods. For example, in various implementations of method 600, act 660 may be performed prior to act 642, so that the master node can participate in the examination of the failure. As another example, various implementations of method 600 may avoid the examination process by always performing cluster-wide failovers instead of considering the opportunity to perform single-node failovers. Such a variation may eliminate acts 642, 644, 652, 672, and 682.

Figure 7:
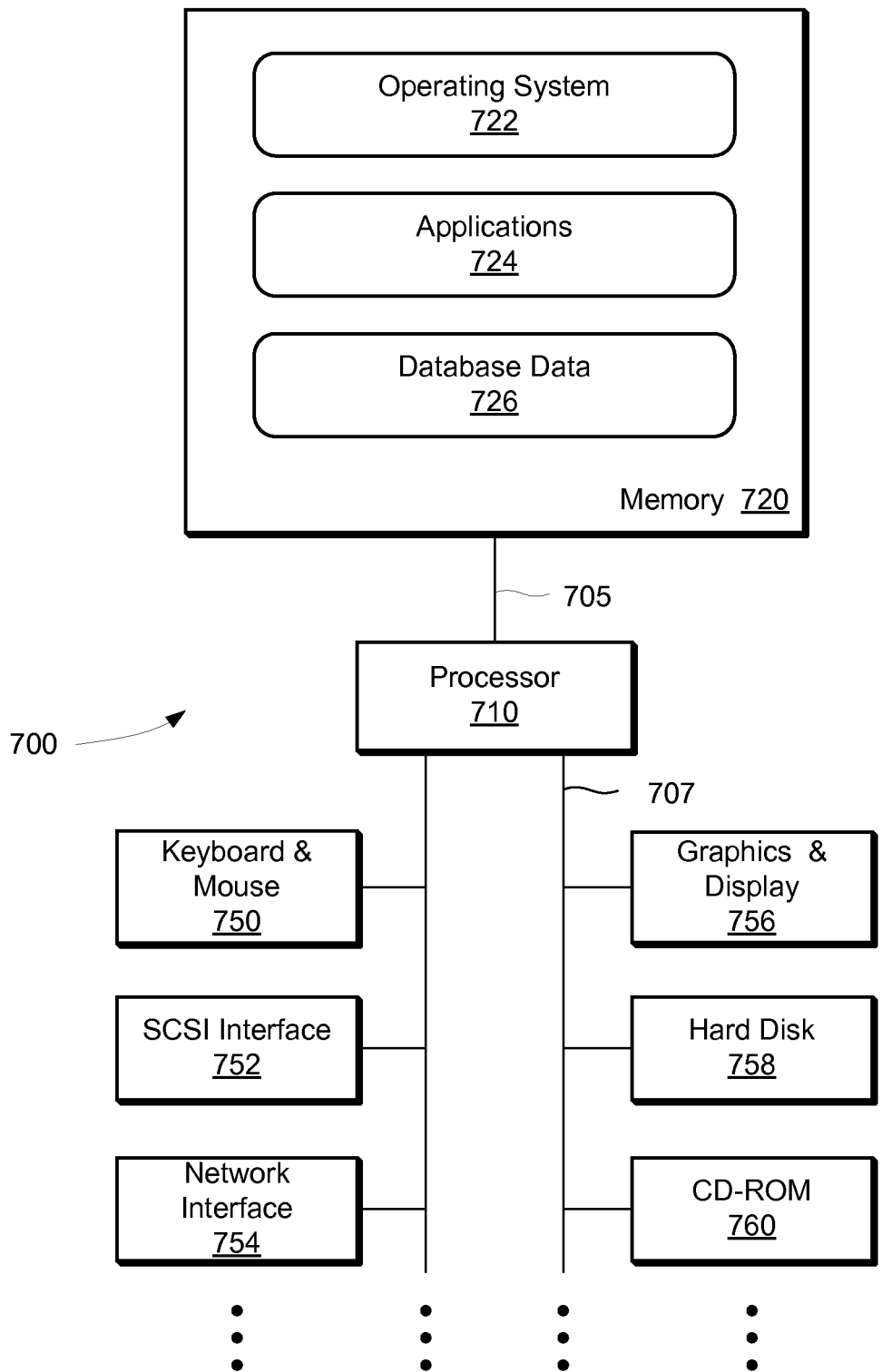
FIG. 7 is a block diagram of one implementation of a computer system.

FIG. 7 is a block diagram of one implementation of a computer system 700 that may be used for one or more of the techniques described herein. For example, the computer system 700 may be used to implement one of the previously described devices 120, 130, 150, or 315. The computer system 700 may include a processor 710 and a memory 720 coupled together by a communications bus 705. The processor 710 may be a single processor or a number of individual processors working together. It is also contemplated that the processor 710 may be one or more virtual processors usable with interpreted languages. The memory 720 may be a random access memory (RAM) or some other dynamic storage device and may be capable of storing instructions to be executed by the processor, e.g., an operating system 722 and applications 724, as well as database data 726. The operating system 722 may include software for implementing a file system, managing a multipath storage system, carrying out master node operations in a node cluster, coordinating cluster interactions, or managing port identifiers, or combinations thereof, among others. The applications 724 may include computational applications, accounting software, email servers, database servers, archiving software, interfaces to archiving software, API modules, storage format management software, volume replicators, backup software, encryption software, hashing software, CDP software, user interfaces, or combinations thereof, among others. The memory 720 may also be used for storing temporary variables or other intermediate information during the execution of instructions by the processor 710.

The computer system 700 may also include devices such as a keyboard and mouse 750, a SCSI interface 752, one or more network interfaces 754, a graphics and display 756, a hard disk 758, and a CD-ROM 760, all of which are coupled to the processor 710 by a communications bus 707. It will be apparent to those having ordinary skill in the art that the computer system 700 may also include numerous elements not shown in the figure, such as additional storage devices, communications devices, input devices and output devices, as illustrated by the ellipsis shown.

FIGS. 1-6 illustrate some of the many operational examples of the techniques disclosed in the present application. Those having ordinary skill in the art will readily recognize that certain steps or operations described herein may be eliminated or taken in an alternate order. Moreover, the operations discussed with respect to FIGS. 1-6 may be implemented as one or more software programs for a computer system and encoded in a computer readable medium as instructions executable on one or more processors. The computer readable medium may include a solid-state storage medium, a magnetic storage medium, or an optical storage medium, or combinations thereof. The software programs may also be carried in a communications medium conveying signals encoding the instructions. Separate instances of these programs may be executed on separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above may be utilized with a variety of different storage devices and computing systems with variations in, for example, the number of servers or nodes and the types of operation of the computing system, e.g., various forms of port identifier management, various forms of cluster coordination, various forms of multipath management, or various forms of failover operations, among others.

Those having ordinary skill in the art will readily recognize that the techniques and methods discussed above may be implemented in software using a variety of computer languages, including, for example, traditional computer languages such as assembly language, Pascal, and C; object oriented languages such as C++, C#, and Java; and scripting languages such as Perl and Tcl/Tk. Additionally, the software 722 or 724 may be provided to the computer system via a variety of computer readable media including electronic media (e.g., flash memory), magnetic storage media (e.g., hard disk 758, a floppy disk, etc.), or optical storage media (e.g., CD-ROM 760). Communications media conveying signals encoding the instructions may also be used to provide the software 722 or 724 (e.g., via a network coupled to the network interface 754).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method in a computing system comprising:
 registering a port identifier as a permitted port identifier, using a processor of the computing system, wherein
  the port identifier is assigned to a first port of a plurality of ports of a first node,
  the first node is comprised in a cluster of nodes,
  the registering the port identifier indicates that communication between the cluster of nodes and a storage unit is permitted,
  the storage unit is communicatively coupled to the cluster,
  the registering comprises
   storing a port identifier registration in a storage system, and
  the storage system comprises the storage unit;
 determining whether a failure of a first path occurs during a fencing operation of the first node, wherein
  a single-node failover would defeat the fencing operation,
  the first node is limited to using a single registration key, and
  the port identifier registration is configured to share the single registration key among the cluster of nodes;
 de-assigning the port identifier from the first port, using the processor, wherein the port identifier registration is preserved during the de-assigning; and
 assigning the port identifier to a second port of the plurality of ports, using the processor.

2. The method of claim 1, further comprising:
 detecting a failure of a first path, wherein
  the first path couples the first port and the storage unit to one another, and
  the de-assigning and the assigning the port identifier to the second port are performed in response to the detecting the failure;
 examining a location of the failure with regard to a topology of network paths, wherein the network paths couple the storage unit with nodes in the cluster of nodes;
 in response to the examining the location of the failure, determining whether a single-node failover is adequate to address the failure; and
 in response to a determination that a single-node failover is not adequate to address the failure, updating port assignments in each node in the cluster other than the first node.

3. The method of claim 2, further comprising:
 preserving a port identifier registration for the port identifier at the storage unit.

4. The method of claim 2, wherein the storage unit comprises a logical unit in an active/passive (A/P) storage array, and the determining whether a single-node failover is adequate to address the failure comprises:
 determining whether a single-node failover would cause a trespass onto a passive storage controller in the A/P storage array.

5. The method of claim 4, wherein the first port comprises a host bus adapter on the first node and the registering comprises:
 recording a registration key in the A/P storage array as a permitted registration key for the logical unit, wherein the registration key corresponds to the port identifier.

6. The method of claim 1, further comprising:
 prior to the de-assigning, communicating data between the first port and the storage unit via a first path, wherein the first path couples the first port and the storage unit to one another; and
 after the de-assigning, communicating data between the second port and the storage unit via a second path, wherein the second path couples the second port and the storage unit to one another.

7. The method of claim 1, wherein the registering comprises:
 recording a registration key as a permitted registration key for the storage unit, wherein the registration key corresponds to the port identifier.

8. The method of claim 1, assigning the port identifier to the first port, wherein the storage unit is comprised in a storage array.

9. The method of claim 1, wherein the assigning the port identifier to the second port is performed prior to the de-assigning, the method further comprising:
 communicating data between the first port and the storage unit via a first path, wherein the first path couples the first port and the storage unit to one another;
 detecting a failure of the first path, wherein the de-assigning and the assigning the port identifier to the second port are performed in response to the detecting the failure;
 examining the failure;
 in response to the examining, determining that a single-node failover is adequate to address the failure; and
 after the de-assigning, communicating data between the second port and the storage unit via a second path, wherein the second path couples the second port and the storage unit to one another.

10. The method of claim 1, further comprising:
 communicating data between the first port and the storage unit via a first path, wherein the first path couples the first port and the storage unit to one another;
 detecting a failure of the first path, wherein the de-assigning and the assigning the port identifier to the second port are performed in response to the detecting the failure;
 examining the failure;

in response to the examining, determining that a cluster-wide failover is necessary to address the failure; and after the de-assigning, communicating data between the second port and the storage unit via a second path, wherein the second path couples the second port and the storage unit to one another.

11. The method of claim 10, further comprising:

alerting a master node in the cluster of the failure;

transmitting from the master node, to each node in the cluster, an instruction to perform a failover for the storage unit, wherein the de-assigning and the assigning the port identifier to the second port are performed in response to the instruction; and in response to said transmitting, for each additional node in the cluster other than the first node:
- de-assigning a port identifier associated with the additional node from a first port on the additional node, and
- assigning the port identifier associated with the additional node to a second port on the additional node.

12. A computing node comprising:

a first port;

a non-transitory first computer-readable storage medium, wherein
- the non-transitory first computer-readable storage medium is coupled to the first port,
- the non-transitory first computer-readable storage medium is configured to store a first set of data,
- the first set of data comprises a first port identifier,
- the first port identifier is configured to identify the first port,
- the first port is configured to communicate with a storage unit that stores information in a registration storage area, and
- the information comprises the first port identifier;

a second port;

a non-transitory second computer-readable storage medium, wherein
- the non-transitory second computer-readable storage medium is coupled to the second port; and an identifier management block, wherein
- the identifier management block is coupled to the non-transitory first and second computer-readable storage media,
- the identifier management block is configured to register a first port identifier as a permitted port identifier, wherein
  - registration of the first port identifier indicates that communication between the cluster of nodes and a storage unit is permitted, and
  - the registration of the first port identifier comprises storing a port identifier registration in the registration storage area, and
- respond to receipt of a failover instruction by virtue of being configured to facilitate revision of the first and second sets of data while maintaining the first port identifier in the registration storage area, and
- the revision comprises
  - de-assigning the first port identifier from the first port, and
  - assigning the first port identifier to the second port.

13. The computing node of claim 12, wherein the non-transitory second computer-readable storage medium is configured to store a second set of data, the second set of data comprises a second port identifier, the second port identifier is configured to identify the second port, the second port is configured to communicate with the storage unit, and the information comprises the second port identifier.

14. The computing node of claim 12, wherein the identifier management block is further configured to respond to the receipt of the failover instruction by virtue of being further configured to
- include the first port identifier in the second set of data, and
- remove the first port identifier from the first set of data.

15. The computing node of claim 12, wherein the storage unit comprises:

a logical unit in an active/passive (A/P) storage array.

16. The computing node of claim 15, further comprising:

a first host bus adapter, wherein
the first host bus adapter comprises
the first port, and
the non-transitory first computer-readable storage medium, and a second host bus adapter, wherein
the second host bus adapter comprises
the second port, and
the non-transitory second computer-readable storage medium.

17. The computing node of claim 16, wherein the first port identifier comprises
a first world wide port number (WWPN), the first set of data comprises first WWPN data, the second set of data comprises second WWPN data, and the identifier management block is configured to revise the first WWPN data and the second WWPN data by virtue of being configured to transmit one or more N_Port ID Virtualization (NPIV) commands to the first host bus adapter and the second host bus adapter.

18. The computing node of claim 12, wherein the computing node is in a cluster of computing nodes, and the identifier management block is configured to respond to a cluster-wide failover message from a master node in the cluster of computing nodes.

19. A non-transitory computer-readable storage medium having instructions encoded therein, wherein the instructions are executable by a processor to:

register a port identifier as a permitted port identifier for communicating with a storage unit coupled to the cluster, wherein
- the port identifier is assigned to a first port of a plurality of ports of a first node,
- the first node is comprised in a cluster of nodes,
- registration of the port identifier indicates that communication between the cluster of nodes and a storage unit is permitted,
- the storage unit is communicatively coupled to the cluster,
- the instructions executable by a processor to register comprise instructions executable by a processor to store a port identifier registration in a storage system, and
- the storage system comprises the storage unit;

determine whether a failure of a first path occurs during a fencing operation of the first node, wherein
- a single-node failover would defeat the fencing operation,
- the first node is limited to using a single registration key, and
- the port identifier registration is configured to share the single registration key among the cluster of nodes;

de-assign the port identifier from the first port on the first node, wherein
the port identifier registration is preserved in the storage system; and
assign the port identifier to a second port among the plurality of ports on the first node.

20. The non-transitory computer readable storage medium of claim 19, wherein the first port comprises a first host bus adapter, the second port comprises a second host bus adapter, the storage unit comprises a logical unit in an active/passive (A/P) storage array, the port identifier comprises a world wide port number (WWPN) recorded in the A/P storage array as a permitted identifier for the logical unit, the assigning comprises transmitting an N_Port ID Virtualization (NPIV) command to the second host bus adapter, and the instructions are executable by a processor to:
communicate data between the first port and the storage unit via a first path, wherein the first path couples the first port and the storage unit to one another;
detect a failure of a first path that couples the first port to the storage unit; wherein
the de-assigning and the assigning the port identifier to the second port are performed in response to the detecting the failure; and
examine the failure.

21. The non-transitory computer readable medium of claim 20, wherein the instructions are executable by a processor to:
preserve a port identifier registration for the port identifier on the storage unit.

22. The non-transitory computer readable medium of claim 20, wherein the instructions are executable by a processor to:
determine that a single-node failover is adequate to address the failure; and
communicate data between the second port and the storage unit via a second path, wherein the second path couples the second port and the storage unit to one another.

23. The non-transitory computer readable medium of claim 20, wherein the instructions are executable by a processor to:
determine that a cluster-wide failover is necessary to address the failure;
alert a master node in the cluster of the failure;
transmit from the master node, to each node in the cluster, an instruction to perform a failover for the storage unit, wherein the de-assigning and the assigning the port identifier to the second port are performed in response to the instruction; and
communicate data between the second port and the storage unit via a second path that couples the second port to the storage unit.

* * * * *